Jan. 8, 1952
G. H. TWIGG
2,582,214
PROCESS FOR DRYING ALCOHOLS AND KETONES
Filed March 20, 1947
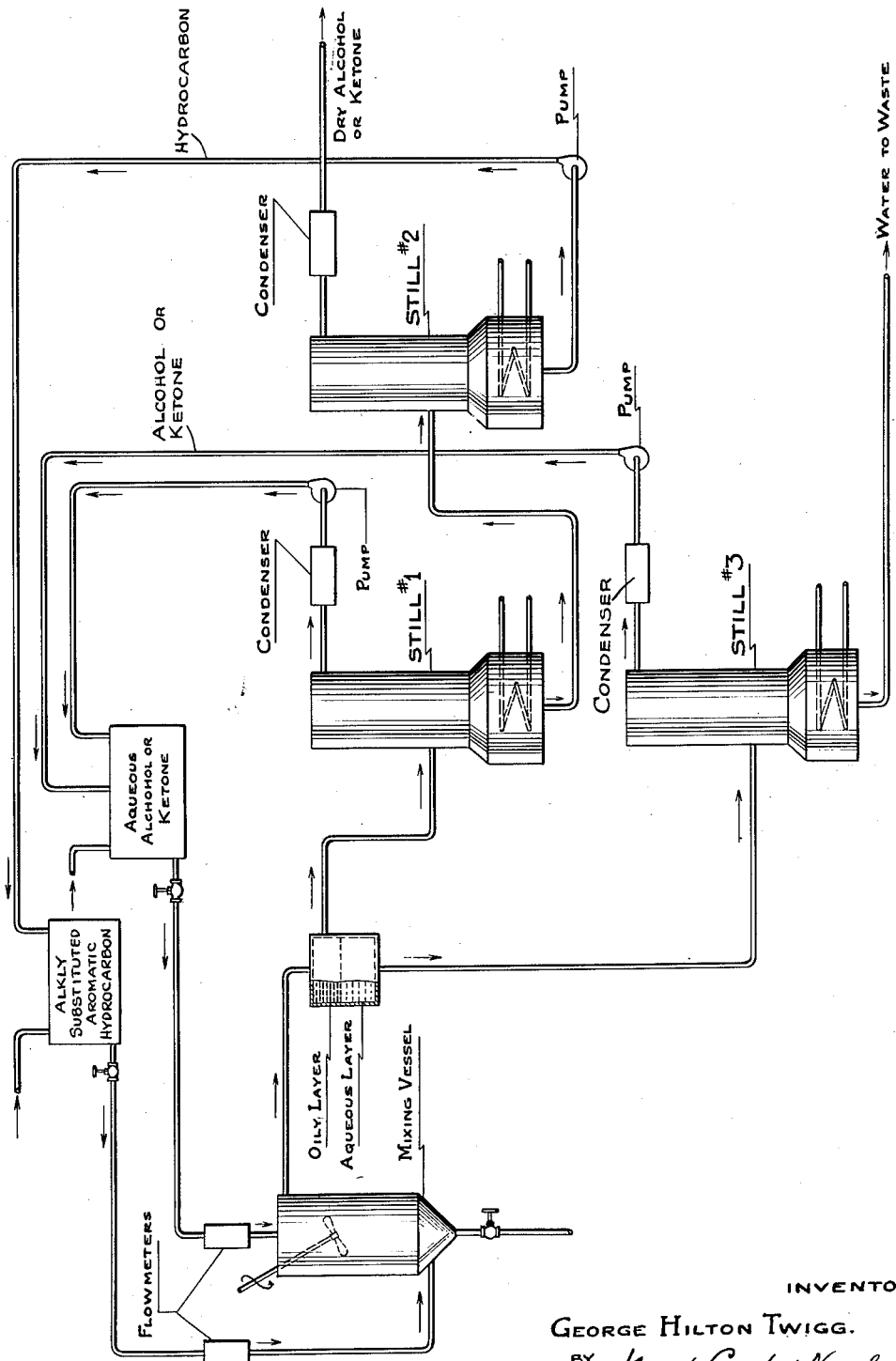
INVENTOR
GEORGE HILTON TWIGG.
BY Ward Crosby & Neal
ATTORNEYS.

Patented Jan. 8, 1952

2,582,214

UNITED STATES PATENT OFFICE 2,582,214

PROCESS FOR DRYING ALCOHOLS AND KETONES

George Hilton Twigg, Cambridge, England, assignor to The Distillers Company, Limited, Edinburgh, Scotland, a British company Application March 20, 1947, Serial No. 736,077
In Great Britain March 20, 1946

8 Claims. (Cl. 202—60)

This invention is for improvements in or relating to a method of removing water from aqueous alcohols or ketones and recovering said alcohols and ketones in a substantially anhydrous and pure state. It refers more particularly to liquid alcohols and ketones of the kind which are only partly miscible with water and which, on distillation form azeotropes therewith. Alcohols or ketones of this kind include n-butanol, secondary butanol, isobutanol, the amyl alcohols, methylethylketone and the like.

It is well known that the complete removal of water from such organic liquid substances as form azeotropes with water, e. g. ethyl alcohol, offers certain difficulties, as a simple fractional distillation does not result in a complete separation of the water from the organic substance. This refers, particularly, to mixtures which contain as much, or more, water than is contained in the azeotrope, because on distillation the total amount of the organic liquid distills over at a fixed temperature in the form of the azeotope.

It is further known that certain auxiliary organic substances can be added to the aqueous mixtures to form ternary mixtures with the organic substance and the water and to serve as entrainers for the water inasmuch as the ternary vapour mixture contains more water than the binary azeotropic mixture would contain.

Consequently, when auxiliary organic substances are applied to a mixture containing water and alcohol or ketone in a proportion corresponding to their azeotrope, or containing less water, a certain quantity of the organic substance free from or impoverished in water would result on distillation. Mixtures with considerably more water than would be contained in the ternary azeotrope, however, could not be freed from water by the use of such auxiliary entrainers. Hence, it follows that when carrying out the process not only the whole of the water contained in the aqueous mixture and part of the organic liquid itself, but also the whole of the entrainer has to be distilled. This leaves in the still the remainder of the organic liquid in a substantially anhydrous form, but generally admixed with small quantities of the entraining substance the complete removal of which requires further fractional distillation or similar treatment.

It is also known from prior British Patent No. 560,169 that acetone may be recovered in an anhydrous form from an acetone-water mixture by removing first a major percentage of the water from said mixture by fractional distillation and subsequently subjecting the water-acetone mixture containing only a minor percentage of water, to a second fractional distillation in a fractionating column into the upper part of which an auxiliary organic liquid is introduced. This auxiliary liquid, which, it is stated, must be kept in the liquid phase throughout the fractionating column, should have a boiling point above 65° C. should not form a binary azeotrope with acetone and should be incapable of forming a ternary azeotrope with water and acetone. As auxiliary substances conforming with the said requirements are enumerated benzene, toluene, ethyl tertiary-amyl ether, tertiary octyl alcohol, secondary amyl acetate, chloro-benzene, isodecane and, particularly, kerosene. The products resulting from the described process are a distillate consisting of an acetone-water fraction free from the auxiliary liquid and a still residue comprising a liquid mixture of anhydrous acetone and the added auxiliary organic liquid.

An object of the present invention is to provide a process for the removal of water from mixtures thereof with alcohols or ketones which are only partly miscible with water and which contain water in varying quantities in a simple and economical manner by reducing the work to be done by the fractional distillation thus saving fuel and cooling water.

Another object of the invention is the recovery of essentially anhydrous alcohols or ketones of the specified kind in a substantially pure state i. e. practically free from detectable quantities of hydrocarbons, from their mixture with water, there being no limit to the amount of water which may initially have been in admixture with said alcohols or ketones.

According to the present invention there is provided a method of drying alcohols and ketones which comprises adding to an aqueous alcohol or ketone of the kind described, a liquid alkyl-substituted aromatic hydrocarbon, miscible with said alcohol or ketone and having a boiling point at least 40° C. higher than that of the said alcohol or ketone, in an amount at least sufficient to cause separation of the mixture into two phases, one of which phases contains the major proportion of the water content of said aqueous alcohol or ketone, separating this phase from the other phase and subjecting said other phase to fractional distillation to produce a fraction consisting of the water-azeotrope of said alcohol or ketone, a higher boiling fraction consisting of substantially pure anhydrous alcohol or ketone and a residue comprising said aromatic hydrocarbon.

The aromatic hydrocarbon remaining in the still, which advantageously still retains a small quantity of the alcohol or ketone to be dried, may then be used again to precipitate water from further quantities of aqueous alcohol or ketone.

Among the aromatic hydrocarbons to be added to the alcohol or ketone to be dried in accordance with this invention there may be mentioned the xylenes (B. P. 138–144.5° C.), ethyl-benzene (B. P. 136° C.), trimethyl benzenes (B. P. 164–176° C.), propyl benzene (B. P. 159° C.), isopropyl benzene (B. P. 152° C.), diethyl benzenes (B. P. 176–183° C.) and the like.

One of the two layers formed contains a major part of the water from the aqueous mixture together with a relatively small amount of the alcohols or ketones substantially free from the aromatic hydrocarbon and is hereinafter called the "aqueous" layer. The other layer, hereinafter called the "oily" layer, contains substantially the whole of the aromatic hydrocarbon and the major part of the alcohols or ketones together with a minor proportion of the water.

The amount of aromatic hydrocarbon to be added to the aqueous alcohol or ketone may vary within wide limits. In general, it can be stated that 50 to 300% by volume calculated on the alcohol or ketone present in the aqueous mixture will be sufficient to produce the desired effect. An increase of the quantity of aromatic hydrocarbons beyond the said proportion will reduce the water content in the "oily" layer still further, but introduces fresh difficulties into the process as the increase in bulk requires more manpower for handling during the mixing and separation, e. g. by decantation, and also might entail greater losses of the material which otherwise does not suffer any deterioration and is returned into the process. The amount of the aromatic hydrocarbon to be used depends on the quantity of water considered admissible in the "oily" layer without making the process uneconomical.

In some cases it may be advantageous to add the aromatic hydrocarbon to the aqueous mixture at an elevated temperature e. g. at a temperature approaching the boiling point of water.

It is preferred to employ aromatic hydrocarbons which are substantially free from aliphatic hydrocarbons as the latter have a tendency to form azeotropes with the alcohols or ketones to be dried. Their presence leads to a contamination of the distilled product whilst a pure aromatic hydrocarbon yields a practically pure alcohol or ketone distillate i. e. a distillate substantially free from hydrocarbons. The high boiling point of the aromatic hydrocarbon on the other hand, is not a drawback, as it does not require extra heat for its distillation and a cooling operation for its condensation which an entrainer would necessitate. On the contrary, the aromatic hydrocarbon remains behind in the still after the alcohol or ketone has been distilled off and does not require distillation.

The "aqueous" layer containing most of the water and some of the alcohol or ketone to be dried may be treated by subjecting it to distillation which causes a binary azeotrope of the alcohol or ketone and water to pass over first. This azeotrope is condensed separately, and may be returned to the drying process of the invention by adding it to further quantities of aqueous alcohol or ketone to be dried.

The process of the present invention may be applied with special advantage to the drying of alcohols and ketones which, on distillation with water, form azeotropes which do not separate into two layers on condensation. It may, however, also be applied with advantage to those alcohols and ketones, whose azeotropes with water form two layers on condensation. The process of the invention is particularly applicable to the drying, and incidental purification, of n-butanol, isobutanol and dimethyl ethyl carbinol.

The process of this invention may be carried out batchwise or in a continuous manner. In the latter case the procedure may be as follows:

The aqueous alcohol or ketone is mixed either continuously or intermittently with the alkyl-substituted aromatic hydrocarbon and the two layers so formed separated in a separator from which the "oily" layer flows continuously into a still from the top of which substantially all the water contained in the "oily" layer is removed in the form of an alcohol or ketone-water azeotrope which may then be condensed and added to a storage tank for the initial aqueous alcohol or ketone. From the base of the still a mixture of the alcohol or ketone and the alkyl-substituted aromatic hydrocarbon is conveyed to another still. From the top of this latter still the greater part of the alcohol or ketone is removed in a substantially pure and anhydrous state, whilst from its base, substantially all the alkyl-substituted aromatic hydrocarbon, together with a small proportion of the alcohol or ketone, is withdrawn and returned to a storage tank for the alkyl-substituted aromatic hydrocarbon, from which it is withdrawn to be mixed with the aqueous alcohol or ketone to be dried. The "aqueous" layer from the separator may be conveyed to a third still at the top of which is obtained substantially all of the alcohol or ketone of the "aqueous" layer in the form of its azeotrope with water. This is returned to the storage tank for the aqueous alcohol or ketone for recycling. From the base of the third still, the greater proportion of the water originally present in the aqueous alcohol or ketone feed is withdrawn and consigned to waste.

The manner in which the invention may be carried into practice is exemplified by the following general description of the way in which aqueous secondary butanol is dried and a secondary butanol is obtained substantially free from water and other admixtures.

The wet secondary butanol is thoroughly mixed with diethylbenzene whereby two layers are formed. The upper "oily" layer is separated from the lower "aqueous" layer. It contains almost all the butanol with very little water and the major part of the diethylbenzene. The other, lower or "aqueous" layer contains most of the water, some butanol and scarcely any diethylbenzene. When the "oily" layer is subjected to fractional distillation a small quantity of the butanol-water azeotrope distills over first. The next fraction is dry butanol substantially free from diethylbenzene. The residue is diethylbenzene containing some butanol, the amount depending upon the extent to which the distillation has been carried through; it may be employed again for the process of drying further amounts of butanol. It is advantageous to interrupt the distillation before all the butanol is distilled off thereby ensuring that the overhead product is free from diethylbenzene. By recycling diethylbenzene still containing some butanol and also the butanol-water azeotrope the butanol contained therein is recovered.

On distilling the "aqueous" layer, the first fraction consists substantially of the butanol-water azeotrope which after condensation may also be recycled, whilst the residue consists of practically pure water.

The following examples also illustrate the process of the present invention:

*Example 1.*—To a water-sec. butanol mixture containing 800 g. of butanol and 500 g. water, 1650 g. of diethylbenzene are added. Two layers are formed; the "oily" (upper) layer weighing, after decantation, 2480 g. and the "aqueous" (lower) layer weighing 270 g.

On distillation, the "oily" layer yielded:

Azeotrope—220 g. containing 160 g. butanol, 60 g. water, trace diethyl benzene.
Anhydrous butanol—560 g.
Residue—1700 g. containing 1650 g. diethyl benzene, 50 g. butanol.

Distillation of the "aqueous" layer produced:

Azeotrope—40 g. containing 30 g. butanol, 10 g. water.
Water—230 g.

*Example 2.*—1110 g. of methyl ethyl ketone-water azeotrope, containing 11% water, are mixed with 1650 g. of diethylbenzene which resulted in an "oily" layer weighing 2630 g. and an "aqueous" layer weighing 120 g.

On distillation, the "oily" layer yielded:

Azeotrope—170 g. containing 150 g. methyl ethyl ketone, 20 g. water.
Anhydrous methyl ethyl ketone—720 g.
Residue—1740 g. containing 1650 g. diethyl benzene, 90 g. methyl ethyl ketone.

Distillation of the "aqueous" layer produced:

Azeotrope—23 g. containing 20 g. methyl ethyl ketone, 3 g. water.
Water—97 g.

*Example 3.*—1100 g. of sec. butanol-water azeotrope, containing 300 g. water, are mixed with 1650 g. of isopropyl benzene, which resulted in an "oily" layer weighing 2470 g. and an "aqueous" layer weighing 280 g.

On distillation, the "oily" layer yielded:

Azeotrope _____ 130 g.
Pure dry sec. butanol _____ 690 g.
Residue _____ 1650 g. (isopropyl benzene)

Distillation of the "aqueous" layer produced:

Azeotrope—25 g. containing butanol and water.
Residue—250 g. consisting mainly of water.

The accompanying diagrammatic drawing illustrates the apparatus for use in a continuous process according to this invention. The alkyl-substituted aromatic hydrocarbon and the aqueous alcohol or ketone flow from storage tanks via flowmeters to a mixing vessel and thence to a separator. From this separator the "oily" layer is run into the first still and the water-azeotrope of the alcohol or ketone distilled off, condensed and pumped back to the storage tank for the aqueous alcohol or ketone. The residue from the first still is run into the second still from which dry alcohol or ketone is distilled and condensed. The residue from this still comprises the aromatic hydrocarbon which is pumped to the hydrocarbon storage tank.

The "aqueous" layer from the separator is run into the third still, and the water-azeotrope of the alcohol or ketone distilled off, condensed and pumped back to the storage tank for aqueous alcohol or ketone. The residue from the third still comprises water and is consigned to waste.

What I claim is:

1. A process for the dehydration of a partially water-miscible compound, capable of forming a homogeneous water azeotrope, selected from the group consisting of alcohols and ketones, which comprises adding to a homogeneous aqueous solution of said compound containing at least as much water as the corresponding azeotrope, a benzene hydrocarbon having at least one nuclear alkyl substituent of one to four carbon atoms and which has a boiling point at least 40° C. higher than said compound and is miscible therewith, separating the resulting oil layer and aqueous layer and feeding said oil layer continuously to a first still, the water-azeotrope of said compound being continuously recycled from said first still as distillate to be admixed with said benzene hydrocarbon, and the residue from said first still being continuously fed to a second still from which said compound is removed continuously in the dry condition as distillate.

2. A process as set forth in claim 1, wherein said benzene hydrocarbon is added in an amount of 50–300% by volume of said aqueous solution to said solution based on the amount of said compound therein.

3. A process as set forth in claim 1, wherein said compound is secondary butanol.

4. A process as set forth in claim 1, wherein said compound is methyl ethyl ketone.

5. A process as set forth in claim 1, wherein said benzene hydrocarbon is diethyl benzene.

6. A process as set forth in claim 1, wherein said benzene hydrocarbon is isopropyl benzene.

7. A process as set forth in claim 1, wherein the aqueous layer resulting from the addition of said benzene hydrocarbon to said aqueous solution of said compound is fed to a third still, the water azeotrope of said compound being recycled from said third still as distillate to be admixed with said aqueous solution of said compound.

8. A process as set forth in claim 1, wherein the residue from said second still is recycled to be admixed with said benzene hydrocarbon.

GEORGE HILTON TWIGG.

REFERENCES CITED

The following references are of record in the file of this patent:

UNITED STATES PATENTS

| Number | Name | Date |
|---|---|---|
| 1,394,232 | Stevens | Oct. 18, 1921 |
| 1,524,192 | Mann | Jan. 27, 1925 |
| 1,911,832 | Lewis | May 30, 1933 |
| 2,375,478 | Lake | May 8, 1945 |
| 2,404,163 | Carpenter | July 16, 1946 |
| 2,411,437 | Lake | Nov. 19, 1946 |
| 2,428,611 | Berg | Oct. 7, 1947 |

OTHER REFERENCES

Lecat: "La Azeotropisme dans les Systems Binaires Alcools-Hydrocarbures," Annales de la Societe Scientifique de Bruxelles, Series B, vol. 48, Troisieme Fascicule, Seconde Partie, Memoires (1928), pages 105–120 (pages 111, 112, and 113 relied on). Copy in Library of U. S. Geological Survey, Washington, D. C.